(12) United States Patent
Alriksson et al.

(10) Patent No.: US 8,463,264 B2
(45) Date of Patent: Jun. 11, 2013

(54) EARLY IMS SECURITY

(75) Inventors: Fredrik Alriksson, Sundbyberg (SE);
Fredrik Lindholm, Älvsjö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 368 days.

(21) Appl. No.: 12/673,570

(22) PCT Filed: Aug. 15, 2007

(86) PCT No.: PCT/EP2007/058450
§ 371 (c)(1),
(2), (4) Date: Feb. 15, 2010

(87) PCT Pub. No.: WO2009/021555
PCT Pub. Date: Feb. 19, 2009

(65) Prior Publication Data
US 2011/0124339 A1    May 26, 2011

(51) Int. Cl.
*H04W 60/00* (2009.01)
*H04L 9/00* (2006.01)
*H04B 7/00* (2006.01)

(52) U.S. Cl.
USPC .................. 455/435.1; 380/44; 370/310

(58) Field of Classification Search
USPC ............. 380/44; 710/104, 100, 300, 301, 710/305; 326/30, 62, 63, 80; 365/189.011, 365/189.09; 455/435.1, 436; 370/310, 254, 370/252, 401, 352
See application file for complete search history.

(56) References Cited

U.S. PATENT DOCUMENTS

| | | | |
|---|---|---|---|
| 6,044,268 A * | 3/2000 | Haartsen | 370/294 |
| 7,333,821 B2 * | 2/2008 | Willey | 455/458 |
| 7,664,497 B2 * | 2/2010 | Willey et al. | 455/435.1 |
| 7,974,619 B2 * | 7/2011 | Dutta | 455/428 |
| 8,019,073 B2 * | 9/2011 | Hua et al. | 379/221.01 |
| 8,068,469 B2 * | 11/2011 | Chiu et al. | 370/338 |
| 8,112,523 B2 * | 2/2012 | Van Elburg et al. | 709/225 |
| 8,150,969 B2 * | 4/2012 | Van Elburg et al. | 709/225 |
| 8,195,155 B2 * | 6/2012 | Terrill et al. | 455/433 |
| 2006/0174009 A1 * | 8/2006 | Martiquet et al. | 709/227 |
| 2007/0105557 A1 * | 5/2007 | Israelsson et al. | 455/436 |
| 2007/0195805 A1 * | 8/2007 | Lindgren | 370/401 |
| 2008/0176538 A1 * | 7/2008 | Terrill et al. | 455/414.1 |
| 2011/0091036 A1 * | 4/2011 | Norrman et al. | 380/44 |

OTHER PUBLICATIONS

3GPP SA WG2. "Digital Cellular Telecommunications System (Phase 2+); UMTS; IP Multimedia Subsystem (IMS), Stage 2 (3GPP TS 23 228 version 7 8.0 Release 7); ETSI TS 123 228" ETSI Standards, LIS, Sophia Antipolis Cedex, France, vol. 3-SA2, No. v7.8.0 Jun. 1, 2007 XP014037759.

* cited by examiner

*Primary Examiner* — Melody Mehrpour
(74) *Attorney, Agent, or Firm* — Roger S. Burleigh

(57) ABSTRACT

A method for providing Early IMS Security in a network. In registering a terminal on a telecommunications network, a plurality of private user identities (IMPIs) are derived from the IMSI of the terminal. Some or all of these IMPIs are registered with the network. Each IMPI has its own IRS containing its own IMPUs, enabling different identities of the user to be registered with the network.

15 Claims, 3 Drawing Sheets

EARLY IMS SECURITY

TECHNICAL FIELD

The present invention relates to Early IMS Security. In particular, the invention relates to the generation of private and public user identities in IMS.

BACKGROUND

The Universal Mobile Telecommunications System (UMTS) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packet switched transmissions well beyond the 64 kbps limit of ISDN through the GSM call network, which is a necessity for UMTS data transmission rates of up to 2 Mbps. UMTS is standardised by the $3^{rd}$ Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

IMS provides a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The IMS makes use of the Session Initiation Protocol (SIP) to set up and control calls or sessions between user terminals (or user terminals and application servers). SIP makes it possible for a calling party to establish a packet switched session to a called party (using so-called SIP User Agents, UAs, installed in the user terminals) even though the calling party does not know the current IP address of the called party prior to initiating the call. The Session Description Protocol (SDP), carried by SIP signaling, is used to describe and negotiate the media components of the session. Whilst SIP was created as a user-to-user protocol, IMS allows operators and service providers to control user access to services and to charge users accordingly. The 3GPP has chosen SIP for signaling between a User Equipment (UE) and the IMS as well as between the components within the IMS.

Specific details of the operation of the UMTS communications network and of the various components within such a network can be found from the Technical Specifications for UMTS that are available from http://www.3gpp.org. Further details of the use of SIP within UMTS can be found from the 3GPP Technical Specification TS 24.228 V5.8.0 (2004-03).

FIG. 1 of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

The current 3GPP IMS specifications mandate the use of IMS Authentication and Key Agreement (IMS-AKA) procedures for authentication of users to the IMS network. These procedures are described in 3GPP TS 24.229 and 33.203. Using this approach, a private user identity (IMPI) and one or more public user identities (IMPU) are allocated to the user by the operator. In order to participate in multimedia sessions, the user must register at least one IMPU with the network. The identities are then used by the network to identify the user during the registration and authentication procedure (the IMPI is used to locate the subscriber information, such as user credentials, while the IMPU specifies the user identity with which the user would like to interact, and to which specific services should be tied). The IMPI and IMPUs are stored in an IMS Services Identity Module (ISIM) application on a UMTS Integrated Circuit Card (UICC) at the user's terminal.

Each IMPU is associated with a so called Service Profile. The Service Profile is a collection of service and user related data, which includes, among other things, the Initial filter criteria that provide a simple service logic for the user (i.e., it defines a set of IMS services the public user identity will be able to use).

A user's IMPUs can be grouped into Implicit Registration Sets (IRS). When the user registers any of the IMPUs within an IRS, all other (non-barred) IMPUs within that IRS are also registered in the network. During the registration procedure, the user's terminal is informed about the complete set of IMPUs which were registered in the network as a result of the registration procedure. The terminal may then use any of these IMPUs to originate outgoing communication and can expect to receive incoming communication to any of these IMPUs.

The 3GPP data model outlined in 3GPP TS 23.228 shows that it is possible to define more than one IRS for a single user, when using a USIM or ISIM with the IMS AKA procedures. These can be used to define, for example, a set of work related identities and a set of personal related identities for a user, where the two sets may be registered independently by the user. For example, the work identities may be registered during office hours only, while the personal identities are always registered.

To serve a new subscriber, the operator needs to provision some user related information into the network. This information includes all IMPIs, IMPUs, IRSs and service profiles that the subscriber will be allowed to use. For the subscriber to be able to use the services provided by the operator's IMS network, the terminal needs to be able to provide one IMPI and one IMPU during the registration procedure. When using IMS AKA with ISIM, all IMPIs and at least one IMPU per IRS need to be stored in the ISIM on the UICC.

The 3GPP has also proposed an alternative mechanism, known as "Early IMS Security" (in 3GPP TR 33.978), by which terminals can be allowed to register in an IMS network without using IMS-AKA. This alternative mechanism does not require the use of an ISIM. Using this solution, identities required by the network to identify the user during registration are not stored on the UICC. Instead they are derived from the International Mobile Subscriber Identity (IMSI) of the user, which is stored in a Subscriber Identity Module (SIM) or Universal Subscriber Identity Module (USIM) application. A specific algorithm has been proposed for deriving an IMPI and IMPU, to be used during registration, from the IMSI. The IMPI and IMPU derived from the IMSI are then registered in the network. When the terminal has derived these identities they may be stored in the terminal, but this is optional as they can always be derived/generated from the IMSI (which is stored on the SIM/USIM) when needed. The derived IMPU is also referred to as a "Temporary IMPU".

It will be noted that the IMSI is considered secret information. Since the Temporary IMPU is derived from the IMSI, the Temporary IMPU is not allowed to be used for any purpose other than registration. Instead, the mechanism relies on the fact that this Temporary IMPU is barred and belongs to an IRS that includes other non-barred IMPUs. These other non-barred IMPUs are provided to the terminal by the network during the registration procedure, to be used for subsequent communication with the network. These other IMPUs need to be provisioned by the operator when creating the subscription. The network will only allow a barred IMPU to be used during the registration procedure. It will reject subsequent communication attempts using a barred IMPU.

When Early IMS Security is operated, a single IMPI is derived from the user's IMSI and stored in the SIM or USIM. Only a single IRS can be registered using a specific USIM. If it is desired to register a set of work identities and a set of personal identities using the same SIM/USIM, all these identities have to be included in the same IRS. This means that they must all share the same registration status; it is not possible to register the personal identities but not the work identities.

SUMMARY

In accordance with one aspect of the present invention there is provided a method of registering a terminal on a telecommunications network, comprising deriving a plurality of Private User Identities from an International Mobile Subscriber Identity of a user of the terminal, and registering some or all of the plurality of Private User Identities with the network.

Preferably an Implicit Registration Set is associated with each of the Private User Identities, each Implicit Registration Set containing one or more Public User Identities corresponding to the Private User Identity associated with that Implicit Registration Set. Preferably each Implicit Registration Set provides a distinct set of identities for the user, and all of the plurality of Private User Identities are associated with the same user.

Thus to allow a user using a SIM/USIM connect to a network supporting Early IMS Security and register multiple IRSs, the terminal implementing Early IMS Security is enhanced so that it can derive multiple IMPIs from a single IMSI and register these IMPIs independently from each other. In the network, all these IMPIs are preferably associated to the same user. Each IMPI has its own IRS containing its own IMPUs.

The plurality of Private User Identities may be generated from the International Mobile Subscriber Identity using a counter to distinguish between the different Private User Identities. For example, each Private User Identity may take the form <IMSI><delimiter><counter>@<domain name>.

The network preferably supports Early IMS Security, but may instead, or in addition, support USIM based IMS AKA.

Preferably the terminal controls which of the plurality of Private User Identities are registered with the network. The terminal may register the different Private User Identities through different access networks or using different network interfaces.

In accordance with a second aspect of the present invention there is provided a terminal for attachment to a network, comprising processing means configured to derive a plurality of Private User Identities from an International Mobile Subscriber Identity of a user of the terminal, and communication means for registering some or all of the plurality of Private User Identities with the network. The International Mobile Subscriber Identity is preferably stored on a Subscriber Identity Module or Universal Subscriber Identity Module on a UMTS Integrated Circuit Card attached to the terminal.

DETAILED DESCRIPTION

In the previously proposed mechanism for Early IMS Security, a user terminal derives one IMPI from the IMSI. The format of the IMPI is as follows:

<IMSI>@<domain name>

According to the new proposal, to enable the use of multiple IRS from a single SIM/USIM, the terminal must be enhanced to derive more than one IMPI from a single IMSI. In one embodiment, these IMPIs may take the following format:

<IMSI><delimiter><counter>@<domain name> where <delimiter> is a "_" sign or empty, for example, and <counter> may be an integer, i.e., "1", "2" etc.

Once these additional IMPIs are derived, the registration procedure towards the network is the same as for regular Early IMS Security as previously defined (in 3GPP TR 33.978). Each of the generated IMPIs are then viewed as distinct IMPIs. Early IMS requires that the IMPI can be derived from the Temporary IMPU (the IMPI and Temporary IMPU are both based on the IMSI). Hence, each IMPI is allocated a Temporary IMPU which is barred, and a set of non-barred IMPUs, all of which belong to the same IRS. The IMPIs with their allocated IMPUs are all provisioned in the Home Subscriber Service (HSS).

The terminal may choose to register all IMPIs or a subset of the IMPIs with the network. In principle, a large number of IMPIs can be derived from the same IMSI using this system. The exact number of IMPIs derived by the terminal may be, for example, hard coded in the terminal, or configured in the terminal, or even provisioned in the terminal using an Over-The-Air provisioning procedure.

The terminal may enable the user, or applications within the terminal, to control which IMPI is registered or deregistered, so as to control the set of identities from which outgoing communication can be initiated and for which incoming communication can be received at any given moment.

The network operator must provision these IMPIs with their associated IRSs and IMPUs in the IMS network, in the same way as previously known IMPIs are provisioned with their IRSs and IMPUs. Only identities which have been provisioned in the network can be registered by the terminal.

Figure 1:
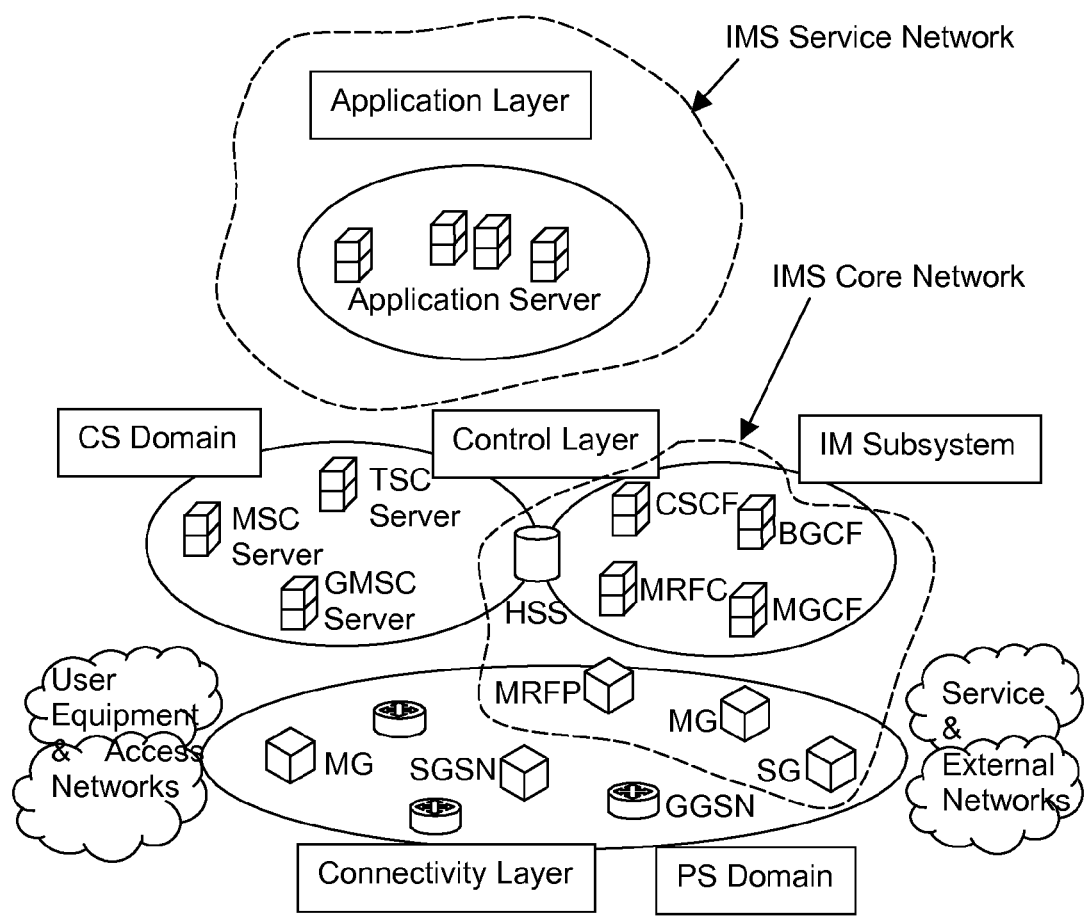
FIG. 1 illustrates schematically the integration of an IP Multimedia Subsystem into a 3G mobile communications system.
Figure 2:
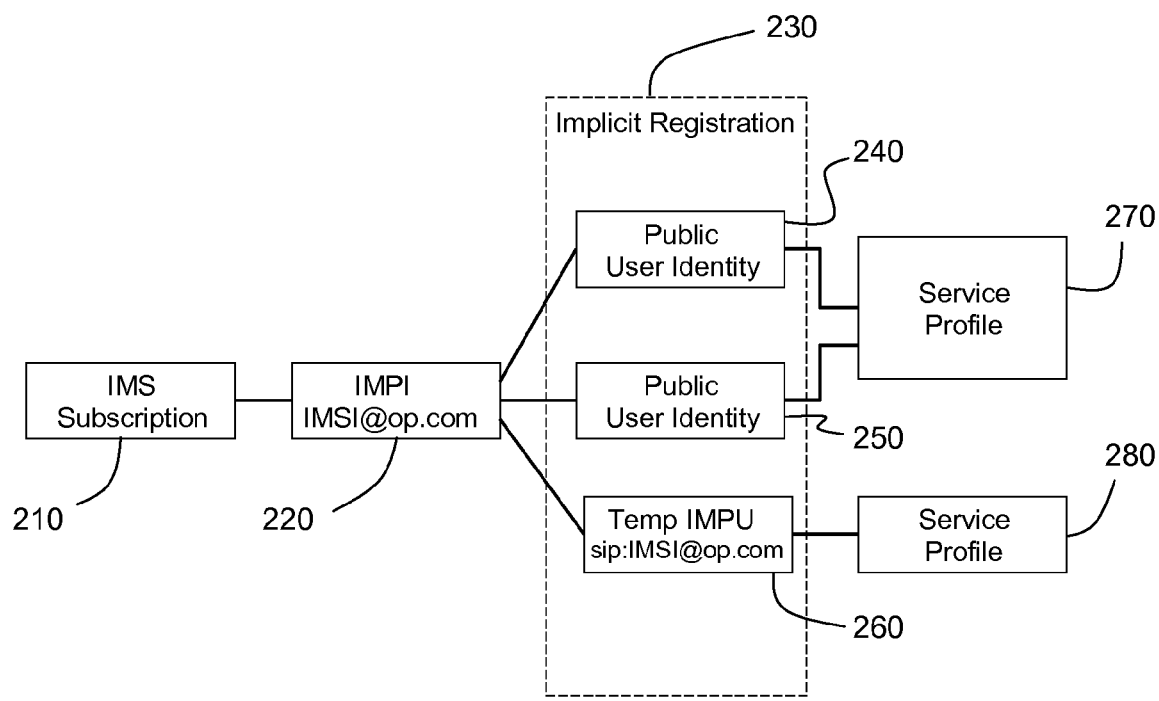
FIG. 2 illustrates the registration of a single IMPI in a network.
Figure 3:
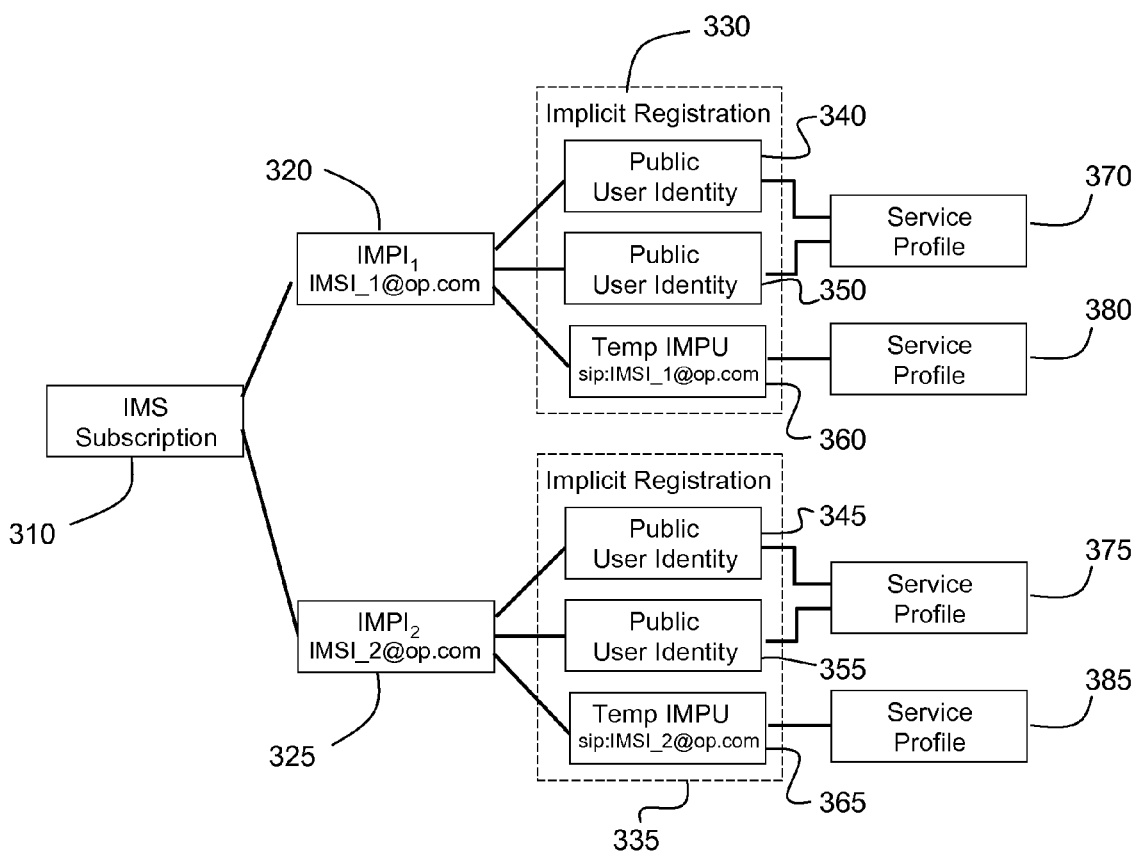
FIG. 3 illustrates the registration of multiple IMPIs in a network.

This can be understood by reference to FIGS. 2 and 3. FIG. 2 illustrates the relationship between identities for a single terminal using SIM/USIM, in accordance with the previously known mechanism for Early IMS Security. The terminal has a unique IMSI 210, from which is derived in IMPI 220 as described above, in this case "IMSI@op.com". Associated with the IMPI 220 are two non-barred IMPUs 240, 250 (which the user can use for communication, e.g., his personal telephone number) and a Temporary IMPU 260 derived from the IMPI 220. All three IMPUs 240, 250, 260 are grouped in an IRS 230. As previously discussed, there is no way to provide different IRSs for different sets of identities. Each IMPU 240, 250, 260 is associated with a service profile 270, 280 which includes the service and user related data for that IMPU. Some service profiles 270 may be shared by more than one IMPU 240, 250; other service profiles 280 may be explicit for a specific IMPU.

FIG. 3 illustrates the relationship between identities for a single terminal using SIM/USIM using the new mechanism for Early IMS Security. The terminal again has a unique IMSI 310, but this time two IMPIs 320, 325 are derived from the IMSI 210. Each IMPI 320, 325 has associated with it a directly derived Temporary IMPU 360, 365 and two further IMPUs 340, 350, 345, 355. The IMPUs are grouped into two IRSs 330, 335, each containing the IMPUs associated with one of the two IMPIs. Each IMPU 340, 350, 360, 345, 355, 365 is again associated with a service profile 370, 380, 375, 385 which includes the service and user related data for that IMPU. The service profiles may again either be shared by more than one IMPU, or be explicit for a specific IMPU.

It is thus possible to provide multiple sets of identities to users using SIM/USIM and networks using Early IMS Security. Services can thus be provided to any of these multiple sets of identities. One example of such a service is a dual-number service, where a terminal with a single SIM/USIM can be used to register both a set of personal identities and a set of work identities for a given user, and where these identities can be registered and deregistered independently of each other.

In addition to Early IMS security, there may be benefits in other scenarios to generate multiple sets of identities from the IMSI. One such other example would be when using a USIM for IMS AKA. Currently, only one USIM can be active on a UICC, which means that a user cannot register using different private user identities at the same time. This is not usually a problem in the case of IMS AKA because different IMPUs can be registered independently of each other (i.e., more than one implicit registration set). However, if a terminal needs to register through multiple accesses at the same time, the current standard does not allow the same IMPI to register from two different contacts (IP addresses) at the same time. This is due to problems in the network in keeping track of the user and handling the user information, such as security associations for IPsec. The present invention can be used to avoid this restriction by allowing the USIM terminal to generate and register using multiple IMPIs. By doing so, the network will be able to handle each registration as separate users and there will not be any protocol changes needed in the network as a result of this.

The invention claimed is:

1. A method in a mobile terminal of registering the terminal on a telecommunications network, comprising the steps of:
   deriving a plurality of Private User Identities from an International Mobile Subscriber Identity of the terminal; and,
   registering some or all of the plurality of Private User Identities with the network.

2. The method of claim 1, further comprising the step of associating an Implicit Registration Set with each of the Private User Identities, each Implicit Registration Set containing one or more Public User Identities corresponding to the Private User Identity associated with that Implicit Registration Set.

3. The method of claim 2, wherein each Implicit Registration Set provides a distinct set of identities for the user.

4. The method of claim 1, wherein all of the plurality of Private User Identities are associated with the same user.

5. The method of claim 1, wherein the plurality of Private User Identities are generated from the International Mobile Subscriber Identity using a counter to distinguish between the different Private User Identities.

6. The method of claim 5, wherein each Private User Identity takes the form <IMSI><delimiter><counter>@<domain name>.

7. The method of claim 1, wherein the terminal controls which of the plurality of Private User Identities are registered with the network.

8. The method of claim 1, wherein the network supports Early IMS Security.

9. The method of claim 1, wherein the terminal registers the different Private User Identities through different access networks or using different network interfaces.

10. The method of claim 1, wherein the network supports Universal Subscriber Identity Module based IMS AKA.

11. A terminal for attachment to a network, comprising:
    processing means configured to derive a plurality of Private User Identities from an International Mobile Subscriber Identity of the terminal; and,
    communication means for registering some or all of the plurality of Private User Identities with the network.

12. The terminal of claim 11, wherein the processing means is configured to associate an Implicit Registration Set with each Private User Identity, each Implicit Registration Set containing one or more Public User Identities corresponding to the Private User Identity associated with that Implicit Registration Set.

13. The terminal of claim 11, wherein the International Mobile Subscriber Identity is stored on a Subscriber Identity Module or Universal Subscriber Identity Module on a UMTS Integrated Circuit Card attached to the terminal.

14. The terminal of claim 11, wherein the plurality of Private User Identities are generated from the International Mobile Subscriber Identity using a counter to distinguish between the different Private User Identities.

15. The terminal of claim 11, wherein each Private User Identity takes the form <IMSI><delimiter><counter>@<domain name>.

* * * * *